Nov. 18, 1952
L. MAYER
2,618,469
CATTLE GUARD
Filed Sept. 6, 1951
2 SHEETS—SHEET 1
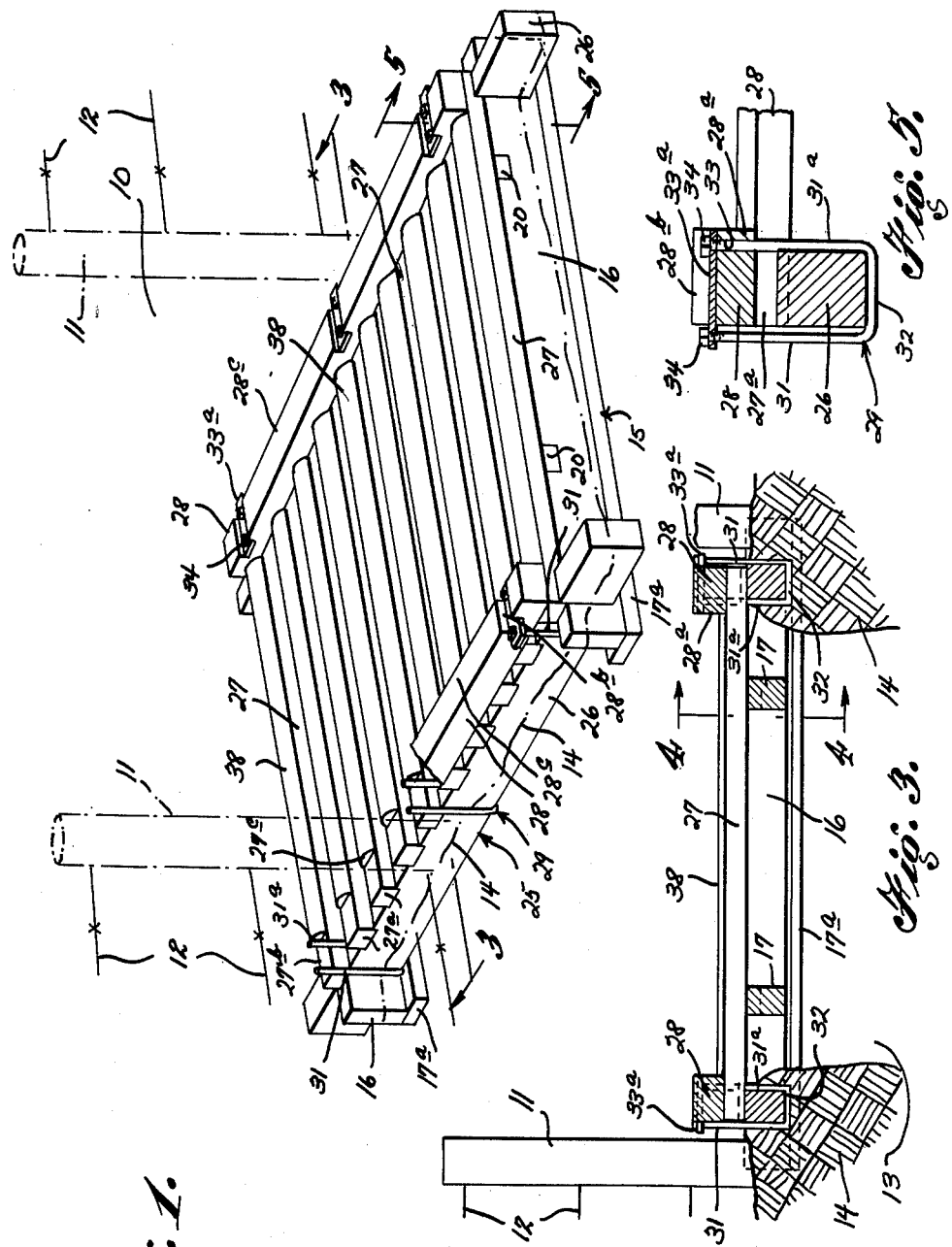
INVENTOR
LOUIS MAYER
BY Wilkinson + Mawhinney
ATTORNEYS

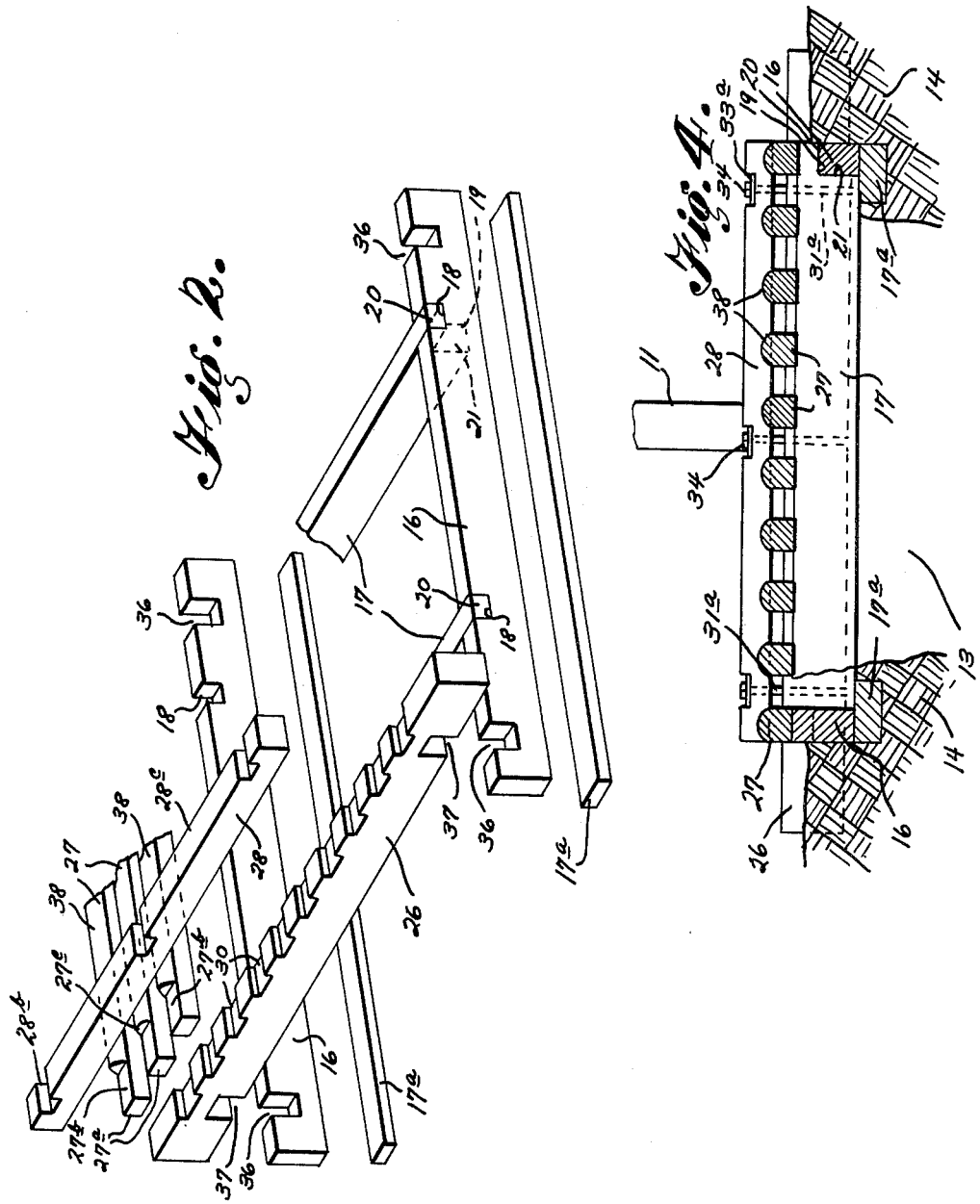

Patented Nov. 18, 1952

2,618,469

UNITED STATES PATENT OFFICE 2,618,469

CATTLE GUARD

Louis Mayer, Whitewood, S. Dak.

Application September 6, 1951, Serial No. 245,331

3 Claims. (Cl. 256—17)

The present invention relates to improvements in a cattle guard and has for an object the provision of a device of this kind which may be quickly and easily removed from its position above the pit to permit cleaning out of the pit when the soil and weather conditions require it.

Another object of the present invention is to provide an improved cattle guard which may be quickly and easily assembled and disassembled by one unskilled workman.

A further object of the present invention is to provide an improved device of this character in which the runners are spaced apart a sufficient distance to reveal the underlying pit to the cattle so that the cattle are fearful of falling into the pit and therefore avoid crossing the guard.

A still further object of the present invention is to provide an improved structure in which the upper surfaces of the runners are rounded so that the hoofs of the cattle attempting to cross the guard will slide off the rounded surface and into the spaces between the runners and the insecure footing thus afforded will cause the cattle to withdraw from the guard and avoid it in the future.

The present invention aims to provide an improved cattle guard in which the upper rounded surfaces of the runners and the spacing of the runners is such that a vehicle, such as an automobile may safely cross the guard without injuring the tires.

The present invention also aims to provide an improved device of this type which is simple in construction, comprises relatively few parts and is economical to manufacture.

With the foregoing and other objects in view, the invention will be hereinafter more fully described and more particularly pointed out in the appended claims.

In the drawings, in which the same parts are denoted by the same reference numerals throughout the several views, Figure 1 is a perspective view of the improved cattle guard constructed in accordance with the present invention and illustrated as applied to a gateway in a fence, Figure 2 is a fragmentary exploded perspective view of the improved device, Figure 3 is a sectional view taken on the line 3—3 of Figure 1, Figure 4 is a sectional view taken on the line 4—4 of Figure 3, and Figure 5 is a sectional view taken on the line 5—5 of Figure 1.

Referring more particularly to the drawings, 10 indicates a gateway formed between posts 11 of a conventional wire fence, the horizontal wires 12 of which are secured to the posts 11 in any conventional manner. A pit or excavation 13 is formed in the ground 14 in the gateway 10 between the posts 11 and extends to each side of the fence the desired distance. The sides of the pit may be walled up in any conventional manner to restrain the dirt from falling into and filling up the pit.

A supporting base generally indicated at 15 may be disposed across the upper portion of the pit and comprises a pair of end pieces 16, a pair of braces 17 and a pair of reinforcing strips 17a. The end pieces have sockets 18 spaced inwardly from their opposite ends and which open through the upper surfaces of the end pieces and extend through the inner and outer faces thereof.

The opposite end portions of the braces 17 are cut away as indicated at 19 to provide end portions 20 of reduced height and outwardly facing shoulders 21. The reduced end portions 20 are received by the sockets 18 and the depth of the sockets and the height of the portions 20 are such that the upper surfaces of the pieces 16 and the portions 20 are substantially flush when the portions 20 are seated in the sockets. The width of the sockets 18 and the portions 20 are substantially the same so that when the portions 20 are seated in the sockets they have a tight fit with the sides of the sockets and relative movement between the pieces 16 and the braces 17 in the direction of length of the pieces 16 will be prevented.

When the portions 20 are received by the sockets 18 the shoulders 21 abut the inner faces of the end pieces 16 to prevent the end pieces from moving towards one another. When properly assembled the end pieces 16 will be disposed in spaced apart substantially parallel relation and the braces 17 will be disposed in spaced apart substantially parallel relation to one another and at substantially right angles to the inner faces of the end pieces.

A cattle guard unit is generally indicated at 25 and comprises a pair of side unit members 26, a plurality of runners 27, a pair of locking bars 28 and fastening elements generally indicated at 29. Each side unit member 26 is formed with a series of longitudinally spaced apart recesses 30, the bottoms and sides of which provide seats. The recesses open through the upper surfaces of the members 26 and extend through the inner and outer faces thereof. The side members are adapted to be positioned in spaced apart substantially parallel relation and the runners 27 which may be elongated have their opposite end portions received by the recesses 30. The width of the runners and the recesses are substantially the same and the opposite sides of the recesses and the runners are straight so that when the end portions of the runners are received by the recesses they will have a tight fit therein. The lower faces of the end portions of the runners and the bottoms of the recesses are flat so that the runners have a firm purchase on the bottoms of the recesses.

The upper part of the opposite end portions of the runners 27 are cut away for a distance substantially equal to the width of each locking bar 28 to provide reduced end portions 27a having flat upper surfaces 27b for receiving the flat bottom of each locking bar and an outwardly facing flat shoulder 27c for engaging the inner flat face of each locking bar.

The runners may be removably locked in the recesses 30 of the members 26 by the locking bars 28 which are adapted to be positioned in overlying engagement with the flat upper surfaces 27b of the reduced end portions 27a of the runners in vertical alignment with the side members 26. The bars 28 are held securely in place by the fastening elements 29 which in the present illustration include substantially U-shaped tie bolts which are adapted to embrace the side members 26 at longitudinally spaced intervals. The elements 29 have legs 31 and 31a which engage the inner and outer faces of the members 26 and connecting portions 32 which engage the lower faces of the members 26.

The locking bars 28 have their outer faces substantially flush with the outer faces of the members 26 but are wider than the members 26 and have portions 28a extending inwardly beyond the inner faces of the members 26. The portions 28a have through openings 33 formed therethrough which open into longitudinally spaced apart notches 28b. The upper free end portions of the legs 31a extend through the openings 33 and have their upper ends disposed in the notches 28b. The upper free end portions of the legs 31 extend above the bottoms of the notches 28a of the bars 28 and outwardly thereof. An apertured clamping plate 33a is received by the upper free end portions of the legs 31 and 31a of each fastening elements which are screw threaded to receive nuts 34 for firmly clamping the plate 33a against the bottom of its notch 28a. The upper ends of the legs 31 and 31a and the nuts 34 are disposed below the upper surfaces 28c of the locking bars 28 when fastening elements 29 are in operative position as illustrated in Figure 5 of the drawings.

The base 15 is adapted to support the unit 25 and for this purpose the end pieces 16 and the side members 26 have cooperating notches 36 and 37 formed therein. The notches 36 are formed in the end pieces 16 outwardly of the sockets 18 and open through the upper surfaces of the end pieces and extend through the inner and outer faces thereof.

The notches 37 are formed in the members 26 adjacent the opposite ends thereof and open through the lower surfaces of the members 26 and extend through the inner and outer faces thereof. The notches 36 and 37 are of such a depth that the bottoms of the recesses 30 of the members 26 are substantially flush with the upper surfaces of the braces 17 when the end pieces 16 and the members 26 are disposed in interlocking engagement as shown in Figure 1 of the drawings so that the lower faces of the runners 27 rest upon the upper surfaces of the braces when the device is in assembled operative position. The width of the notches 36 and 37 are substantially the same as that of the pieces 16 and the members 26 so that a tight fit is obtained when the end pieces and side members are in their interlocking positions. Such an arrangement will impart additional stability to the base 15 and the unit 25.

In the use of the device the parts may be assembled as described above in position above the pit 13 with strips 17a embedded in the ground and the end pieces 16 partially embedded in the ground beyond and adjacent the opposite ends of the pit. The end pieces 16 are supported and strengthened by the strips 17a and the strips 17a are wider than the end pieces 16 so that they extend inwardly of the end pieces and engage and support the braces 17 adjacent the reduced end portions 20 thereof. This will relieve the end pieces 16 and the braces 17 from any strain or tendency to split off.

The unit 25 will be supported by the base 15 and extends through the gateway 10 from one end of the pit to the other. The device could be first assembled and then placed in the position illustrated in Figure 1 of the drawings.

The recesses or seats 30 are placed far enough apart so that the runners are spaced sufficiently to permit the cattle to see the pit and avoid crossing the guard for fear of falling into the pit. However, the runners are close enough together to permit a vehicle, such as, an automobile, to pass over the guard and the upper faces of the runners are rounded as indicated at 38 to prevent injury to the tires of the vehicle. The fact that the ends of the legs 31 and 31a of the elements 29 and the nuts 34 are disposed below the upper surfaces 28c of the bars 28 will prevent them damaging the tires of the vehicle.

The more venturesome cattle will be prevented from crossing the cattle guard since the rounded surfaces 38 of the runners will cause the hoofs of the cattle to slide off the runners and the spacing between adjacent runners is such that the hoofs of the cattle will be received between adjacent runners and the insecure footing thus afforded will cause the cattle to withdraw from the guard and avoid it in the future.

When it is desired to clean out the pit the unit 25 may be lifted out of position in one piece by any suitable means, such as a piece of farm equipment having a hoisting mechanism including chains which may be hooked to the runners 27. If desired, for the purposes of moving the device to a new location or for replacing any of the parts which may be worn or damaged, the runners 27 may be removed by unscrewing the nuts 34 on the fastening elements 29 thereby loosening the locking bars 28 so that one or all of the runners 27 may be removed from their seats 30.

The base 15 and the unit 25 may be made from any suitable material, such as, wood or metal, and each runner and its seat on the base may be given corresponding numbers so that no difficulty results in replacement of the runners. Similarly, numbers may be placed upon the various members of the base. The improved cattle guard may be made of any desired size, for example, seven feet long by nine feet wide.

While the improved cattle guard in the present instance has been illustrated as used in connection with a gateway through a fence, it is to be understood that the improved device may be used in any other location desirable, such as, on a railroad track.

It is obvious that various changes and modifications may be made in the details of construction and design of the above specifically described embodiment of this invention without departing from the spirit thereof, such changes and modifications being restricted only by the scope of the following claims.

What I claim is:

1. A cattle guard adapted to overlie a pit formed in a gateway of a fence comprising a pair of spaced parallel end members disposed parallel with the fence, a pair of spaced parallel side members disposed transversely thereof and having ends overlying the ends of the end members, said end members and side members having cooperating notches formed in their upper and lower surfaces respectively adjacent their ends so that the side and end members are substantially coplanar, said side members having longitudinally spaced transverse slots formed in their upper surfaces between the end members, runners disposed transversely of the side members and having their ends seated in the slots with the upper surfaces of the ends flush with the upper surfaces of the side members, the upper surfaces of the runners between the ends thereof being curved in cross-section and raised above the upper surfaces of the ends, locking bars superimposed on the upper surfaces of the side members and releasable locking means encompassing the side members and locking bars to lock the locking bars over the ends of the runners and restrain said locking bars from lateral or longitudinal movement, the ends of the raised upper surfaces of the runners forming shoulders which abut against the inner sides of the locking bars and locate said runners against axial movement.

2. A cattle guard as claimed in claim 1, wherein said locking means includes transverse slots formed in the upper surfaces of the locking bars, plates seated in said slots and having their ends extending beyond the inner and outer sides of the locking bars, said extending ends being apertured, and U-bolts fitted around the side members and having their free ends disposed through the apertures in the plates, and nuts threaded on the ends of the U-bolts.

3. A cattle guard adapted to overlie a pit formed in a gateway of a fence comprising a pair of spaced parallel end members disposed parallel with the fence, a pair of spaced parallel side members disposed transversely thereof and having ends overlying the ends of the end members, means securing the ends together at their point of crossing, said side members having longitudinally spaced transverse slots formed in their upper surfaces between the end members, runners disposed transversely of the side members and having their ends seated in the slots with the upper surfaces of the ends flush with the upper surfaces of the side members, the upper surfaces of the runners between the ends thereof being curved in cross-section and raised above the upper surfaces of the ends, locking bars superimposed on the upper surfaces of the side members and releasable locking means encompassing the side members and locking bars to lock the locking bars over the ends of the runners and restrain said locking bars from lateral or longitudinal movement, the ends of the raised upper surfaces of the runners forming shoulders which abut against the inner sides of the locking bars and locate said runners against axial movement.

LOUIS MAYER.

REFERENCES CITED

The following references are of record in the file of this patent:

UNITED STATES PATENTS

| Number | Name | Date |
|---|---|---|
| 2,052,851 | Snipes | Sept. 1, 1936 |
| 2,518,855 | Balzer | Aug. 15, 1950 |